June 22, 1965 A. W. BROWN 3,190,322
AIRCRAFT UNDER-WING FUELING NOZZLE AND VALVE
AND SEALING MEANS THEREFOR
Filed Oct. 3, 1962 3 Sheets-Sheet 2

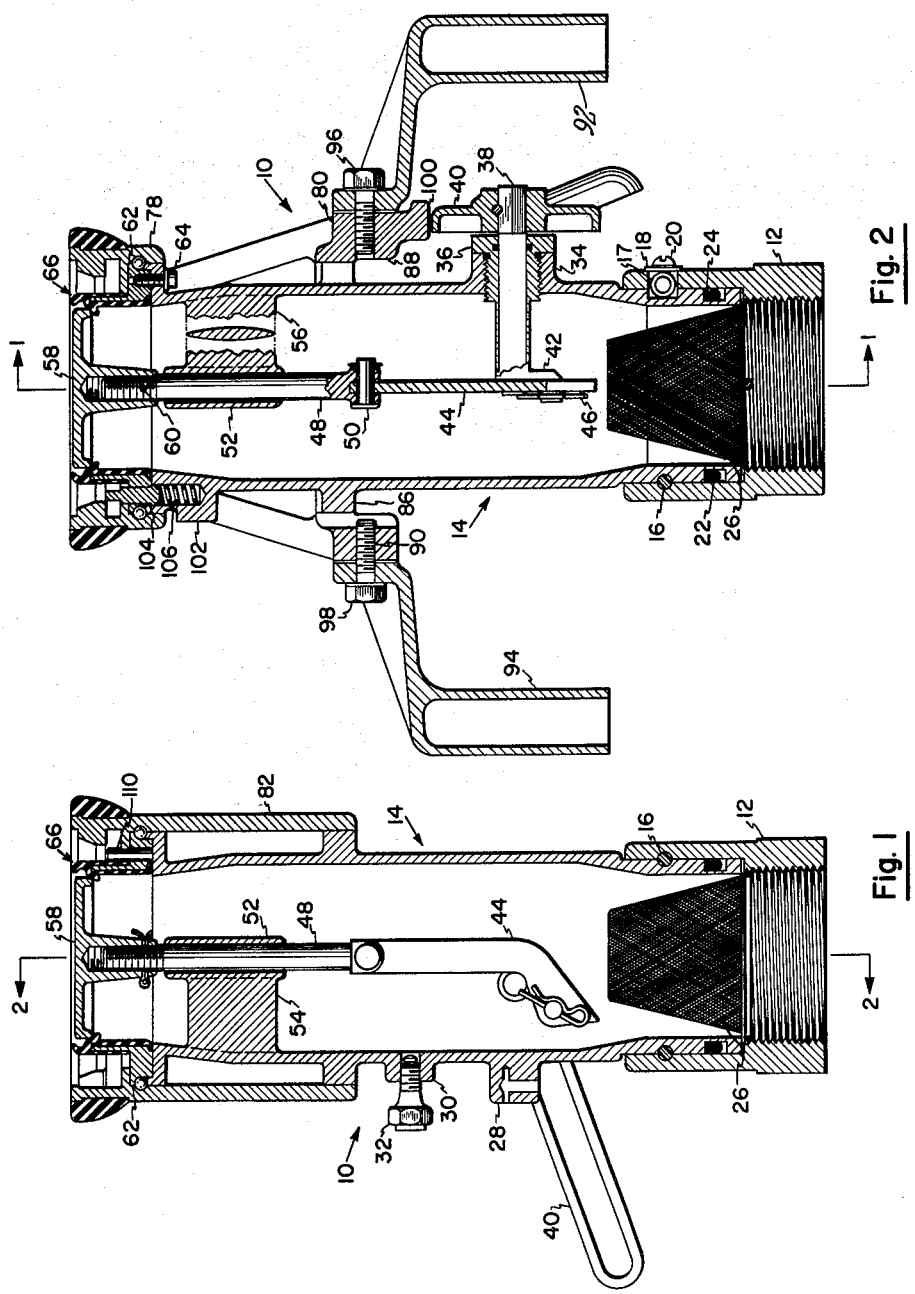

INVENTOR
ALBERT WILLIAM BROWN
BY
ATTORNEYS

June 22, 1965 A. W. BROWN 3,190,322
AIRCRAFT UNDER-WING FUELING NOZZLE AND VALVE
AND SEALING MEANS THEREFOR
Filed Oct. 3, 1962 3 Sheets-Sheet 3

INVENTOR
ALBERT WILLIAM BROWN
BY
ATTORNEYS

United States Patent Office 3,190,322
Patented June 22, 1965

3,190,322
AIRCRAFT UNDER-WING FUELING NOZZLE AND VALVE AND SEALING MEANS THEREFOR
Albert William Brown, Newport Beach, Calif., assignor to J. C. Carter Company, Costa Mesa, Calif., a corporation of California
Filed Oct. 3, 1962, Ser. No. 228,042
10 Claims. (Cl. 141—387)

This invention relates to fueling nozzles and valves. It relates particularly to fueling nozzles and valves adapted for under-wing fueling of aircraft, a nozzle of this kind being on the end of a fueling hose and a valve of this kind being located in the bottom wall of an aircraft wing tank and being accessible on one side from the exterior of the aircraft.

This invention relates more particularly to a fueling nozzle and valve of the kind described which are adapted to have direct mechanical connection made between them when fueling operations are undertaken, and which, when so connected, are adapted further to have a rising poppet or disc element in the nozzle displace a disc or plate element in the valve which is normally maintained in position to keep the valve closed, thereby opening the valve.

This invention relates still more particularly to a sealing means adapted to maintain a fluid-tight end closure of the aforedescribed fueling nozzle when the nozzle is disconnected from the valve, and also to maintain the joint between the nozzle and the aforedescribed valve fluid-tight when the nozzle and valve are connected mechanically.

This invention relates even still more particularly to a fueling nozzle including a nozzle body portion and a swivel-type coupling for the attachment of a fueling hose, the body portion and the coupling being rotatably connected on a plastic bearing.

It is an object of this invention to provide a sealing means for a poppet-type nozzle, especially an aircraft fueling nozzle of this type, which will maintain a fluid-tight closure of this nozzle at its outlet and when the poppet element of the nozzle is lowered or retracted into the nozzle body structures, particularly when the nozzle is not connected at its outlet end to a tank valve or any other device or mechanism.

It is another object of this invention to provide a sealing means as recited in the object just stated which will additionally maintain the joint between said poppet-type fueling nozzle for aircraft and a mating aircraft wing tank valve fluid-tight when the nozzle and valve are connected mechanically, regardless of whether the poppet element of the nozzle is lowered or retracted into the nozzle body structure to close the nozzle at its outlet end, or raised or extended beyond the nozzle body structure to open the nozzle.

It is another object of this invention to provide a sealing means as recited in the object just stated of which the sealing effects are enhanced with increased fluid pressure exerted upon this means.

It is another object of this invention to provide a novel plastic bearing means whereby the nozzle body portion and a swivel type coupling for the attachment of a fueling hose are rotatably connected.

These and other objects and advantages of this invention as well as its nature and substance will be more clearly perceived and fully understood by referring to the following description and claims taken in connection with the accompanying drawings in which:

FIG. 1 represents a view in sectional elevation through an aircraft fueling nozzle according to this invention taken along line 1—1 in FIG. 2 looking in the direction of the arrows, the poppet element of the nozzle being lowered to close the nozzle at its outlet end, and the nozzle itself not being connected to a tank valve or any other device or mechanism;

FIG. 2 represents a view in sectional elevation through the aircraft fueling nozzle of FIG. 1 taken along line 2—2 therein;

Figure 3:
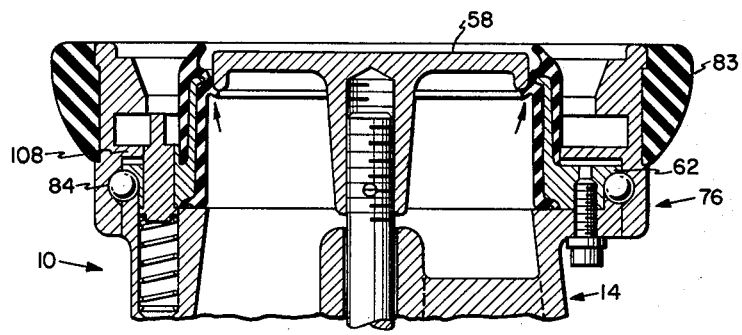
FIG. 3 represents an enlarged view of the outlet end of the aircraft fueling nozzle of FIG. 2.

Referring now to the drawings in detail, especially FIGS. 1, 2, 3, and 6 thereof, the assembled fueling nozzle of this invention is designated 10. At the lower end of the nozzle assembly and constituting an element of the nozzle assembly there is a swivel-type housing or coupling 12 which is internally threaded at its own lower end to receive an externally threaded end fitting of a fueling hose. Directly above swivel-type coupling 12 and fitting part way into it is nozzle body 14. The coupling and the nozzle body are located axially with respect to each other by means of a flexible rod-like plastic bearing element 16 which is seated in matching half-round grooves formed in and on coupling 12 and nozzle body 14. Bearing element 16 may, for example, be made of "Teflon," a plastic product of E. I. du Pont de Nemours & Co. consisting of tetrafluoroethylene polymer. This material has a surface which is oily or waxy to the touch.

In the installation shown, "Teflon" bearing element 16 has a short sleeve member 17 fitted tightly around it close to one of its ends. The bearing element is put in place between coupling 12 and nozzle body 14 by inserting its free end, that is, its end distant from sleeve 17, through a slot in the coupling which communicates with the half-round groove therein, and thus with the full-round groove between the nozzle body and the coupling. Flexible rod element 16 which has a length substantially equal to that of the full-round groove in question is fed into this groove until sleeve 17 is brought up to the entrance slot in coupling 16 which has a specially locally enlarged region to accommodate the sleeve. Sleeve 17 is thus definitely but accessibly located in the coupling from which it may be easily flipped out for withdrawal of bearing element 16 to allow separation of swivel-type coupling 12 from nozzle body 14 when desired. With bearing element 16 and its sleeve 17 properly in place to connect the coupling and the nozzle body, a curved cover plate 18 held by a screw 20 and a detent dimple not shown is installed over the aforementioned slot in coupling 16.

Coupling 12 is free to turn or swivel with respect to nozzle body 14 on the relatively slick surface of bearing element 16. Fluid sealing between the coupling and the nozzle body in their overlapping region is effected by an O-ring 22 and a back-up piece of flat ring packing 24 both located in a groove in the nozzle body. Within the nozzle body at its lower end there is a wire mesh strainer 26. This strainer is formed with a flange at its lower end which, for purpose of location and retention of the strainer, is sized to fit freely into a small annular clearance region existing between the bottom surface of nozzle body 14 and an internal shoulder on coupling 12.

Somewhat less than half-way up its length, nozzle body 14 is formed with a boss 28 to which a grounding cable may be attached, if desired. In substantial vertical alignment with boss 28 and a short ways above it is a boss 30 which is drilled and tapped axially to communicate with the interior of the nozzle body. A push-type vacuum breaker valve 32 is threaded into this boss. Valve 32 may be of any suitable commercial kind.

About one-quarter of the way around nozzle body 14 from boss 28 is a boss 34 which is drilled and tapped axially to communicate with the interior of the nozzle body. Threaded into this boss and suitably sealed therewithin a bushing 36 which serves as a crank shaft bushing. Extending through the crank shaft bushing and suitably sealed therewithin is a crank shaft 38 to the outer end of which is fastened a crank handle 40. A crank 42 suitably formed with a crank pin portion is fitted to the inner end of the crank shaft. The crank pin portion of crank 42 extends through the lower end of poppet link 44 in rotatable relation therewith. This link is secured on the crank pin portion by means of a hairpin cotter 46.

Poppet link 44 extends generally upwardly, and at its upper end enters a slot formed in the lower end of poppet shaft 48, and is rotatably secured to this shaft by means of rivet 50. The poppet shaft extends straight up through guide bearing 52 which is supported on the centerline axis of nozzle body 14 by struts 54 and 56, this guide bearing and these struts actually being formed integrally with the nozzle body. The upper end of poppet shaft 48 beyond bearing 52 is threaded, and nozzle poppet element 58 is in screwed engagement therewith. The poppet is secured on the popper shaft by means of cotter pin 60.

Seated on and in the outwardly flanged and slightly internally recessed upper end of nozzle body 14 is poppet sealing means support ring 62. This support ring is attached to the nozzle body by means of a plurality of screws 64 which may be somewhat irregularly spaced. Seated on top of and extending down either side of the principal vertical portion of support ring 62 is poppet sealing means 66 which is made of a flexible, resilient, and hydrocarbon-resistant material. Sealing means 66 may, for example, be made of "neoprene," a long-chain synthetic rubber product of E. I. du Pont de Nemours Co. made by the polymerization of chloroprene. This amp. means is shown without any distortion sealing in FIG. 6.

In connection with FIGS. 1, 2, and 3, it is to be noted that sealing means 66 has an annularly shaped cut out internal region 67 wherein support ring 62 makes at least semi-hooked engagement at its upper end; a lower, outwardly extending lip 68 which fits in an inner bottom groove or recess in ring 62, and a bottom protuberance 70 which extends below it. Lip 68 and protuberance 70 are squeezed against the upper end of nozzle body 14 when screws 64 are tightened, and make a fluid-tight seal between the nozzle body and the poppet sealing means support ring.

It is to be noted further that sealing means 66 has an inwardly extending lip 72 fairly close to but at least a short ways below its top edge, this lip being characterized by an upwardly and outwardly slanting upper surface 74. It is against this lip and particularly against the designated sloping surface thereof that poppet element 58 is seated and sealed in its lowered position as shown in FIGS. 1, 2, and 3, and indeed in FIG. 4 also, to effect fluid-tight closure of the upper or outlet end of fueling nozzle 10. Referring particularly to FIG. 3, it may be seen that as poppet 58 has seated against sealing means 66 it has borne upon and deformed lip 72 in such a way that fluid pressure within nozzle 10 exerted against this lip, as indicated by the arrows, tends to press this lip against the rim or flange of the poppet. This being the case, the sealing effect of sealing means 66 against poppet 58 and, accordingly, the fluid-tightness of the closure of the outlet end of nozzle 10 are enhanced with increased fluid pressure within the nozzle exerted upon sealing means 66.

Surrounding poppet sealing means support ring 62 and the upper portion of nozzle body 14 is a collar structure 76 of cage-like configuration comprising an upper ring portion 78, a lower end portion 80, and a plurality of substantially vertically extending connecting members 82 whereby the upper and lower ring portions are joined. A bumper 83 of "neoprene" or other suitable resilient material encircles and fits tightly onto the upper ring portion. Collar 76 is supported rotatably with respect to nozzle body 14 by a plurality of ball bearings 84 which run in an annular groove defined on one side in upper ring portion 78 of the collar structure and on the other in-nozzle body 14 and poppet sealing means support ring 62. Loading of these ball bearings into this groove is effected through a suitable opening, not shown, in the horizontally extending portion of support 62 near its outer edge.

Collar structure lower ring portion 80 has a fairly close rotating fit around the curved outer surfaces of a plurality of circumferentially distributed protuberances or bosses 86 formed on nozzle body 14. Formed integrally with lower ring portion 80 and, therefore, integrally with the whole collar structure, are descending boss portions 88 and 90. These bosses are drilled and tapper or provided with "Heli-Coil" inserts to allow attachment to them respectively of handles 92 and 94 by means of screws 96 and 98. Boss 88 is characterized by a descending foot portion 100 which, as shown, terminates closely above the hub of crank handle 40.

The hub of handle 40 is generally circular, but in at least one region of appreciable size its peripheral surface is substantially flat. This flat region occurs directly under foot portion 100 as collar structure 76 is oriented with respect to nozzle body 14 in FIG. 2, and handle 40 cannot be turned down to raise poppet 58 without the collar structure first being turned on bearings 84 to move foot portion 100 clear of the flat peripheral region on the handle hub. When collar structure 76 is free to turn on its bearings, the method and means of locking and unlocking this structure with respect to nozzle body 14 being explained hereinafter, the extent of its rotation is limited by stop boss 102 formed on nozzle body 14 which extends out between two of the vertical connecting members 82 of the collar structure. The angle between extreme positions of rotation of collar structure 76 might be about 30°, for example.

As it is shown in FIGS. 2 and 3, collar structure 76 is locked in angular position with respect to nozzle body 14 by means of shouldered pin 104, one of several such pins in the whole assembly of fueling nozzle 10, which is urged upwardly by a coil spring 106. This coil spring is fully contained within a vertical, blind-bottomed hole in nozzle body 14 close to the edge of the upper end thereof. Locking pin 104 works up and down in this hole and also up and down in an axially aligned hole of somewhat smaller diameter in poppet sealing means support ring 62. The overhang of the support ring around the edge of the hole in the nozzle body provides a surface to engage the upper surface of the bottom shoulder or collar portion formed on pin 104, and thus limit the upward travel of the locking pin.

Formed as an integral part of collar structure 76 and extending inwardly from upper ring portion 78 thereof is an annular rim 108. The inner edge of this rim is arcuately cut out or scalloped in a plurality of places corresponding in number to the number of locking pins 104, for example, three cut out places and three pins equally spaced. The size, shape, and distribution of these cut out places is such that when collar structure 76 is oriented with respect to nozzle body 14 as shown in FIG. 2, that is, with foot portion 100 more or less directly over the flat peripheral region of the hub of handle 40, each locking pin 104 under the urging of the spring 106 below it can rise into and occupy substantially the entirety of a cut out place. Such occupation provides a locking action to prevent relative rotation between collar structure 76 and nozzle body 14.

An item of structure to be noted in FIG. 1 is index pin 110 which is one of several such pins in the whole assembly of fueling nozzle 10, for example, three pins equally spaced. The index pins are press fitted and swedged into holes in the horizontally extending portion of poppet sealing means support ring 62. The function of index pins 110 is described hereinafter.

Figure 4:
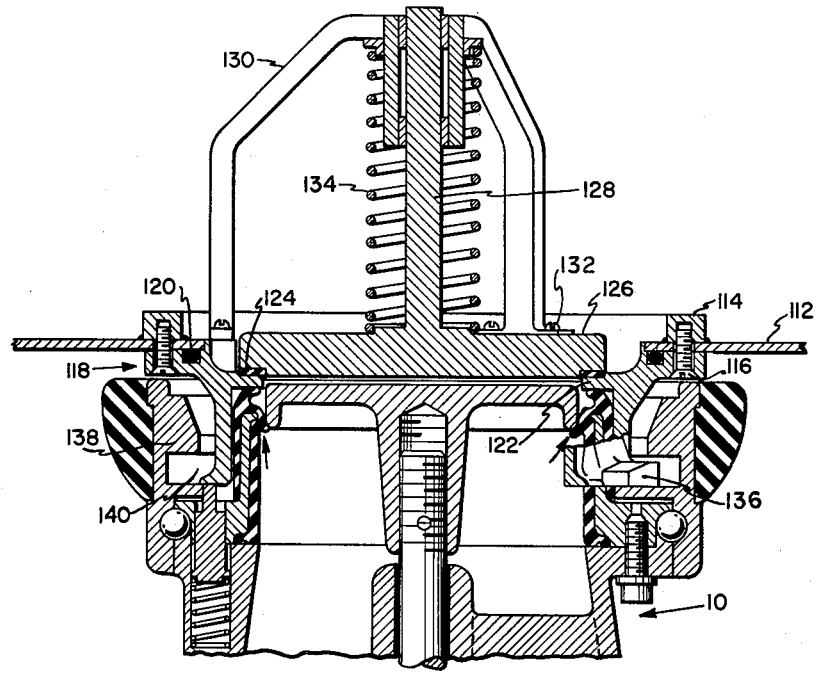
FIG. 4 represents an enlarged view of the outlet end of the aircraft fueling nozzle of FIG. 2, this nozzle having been connected mechanically to an aircraft wing tank valve, the disc element of which is in lowered position on its seat whereby the valve is maintained closed.

Referring next to FIG. 4, the bottom panel of an aircraft wing tank is designated 112. Cut in this panel is a hole for the accommodation of a tank valve structure. Surrounding this hole in spaced relation to the edge of it is a stiffener ring 114 which is welded all along its inner and outer bottom edges to the upper surface of panel 112 to be joined to this panel in entirely fluid-tight fashion.

Attached to the underside of tank panel 12 by means of a plurality of screws 116 is a ring or sleeve 118 which provides a tank valve seat and also serves as means for connecting fueling nozzle 10 to the wing tank. Screws 116 pass through clear holes in outwardly extending ear portions along the upper edge of sleeve 118 and are threaded into blind tapped holes in tank panel 112 and stiffener ring 114. Sleeve 118 is circumferentially grooved on its upper surface to receive an O-ring sealing element 120. This element is compressed against the under side of tank panel 112 when sleeve 118 is attached thereto to render the joint between the sleeve and the panel fluid-tight.

Figure 5:
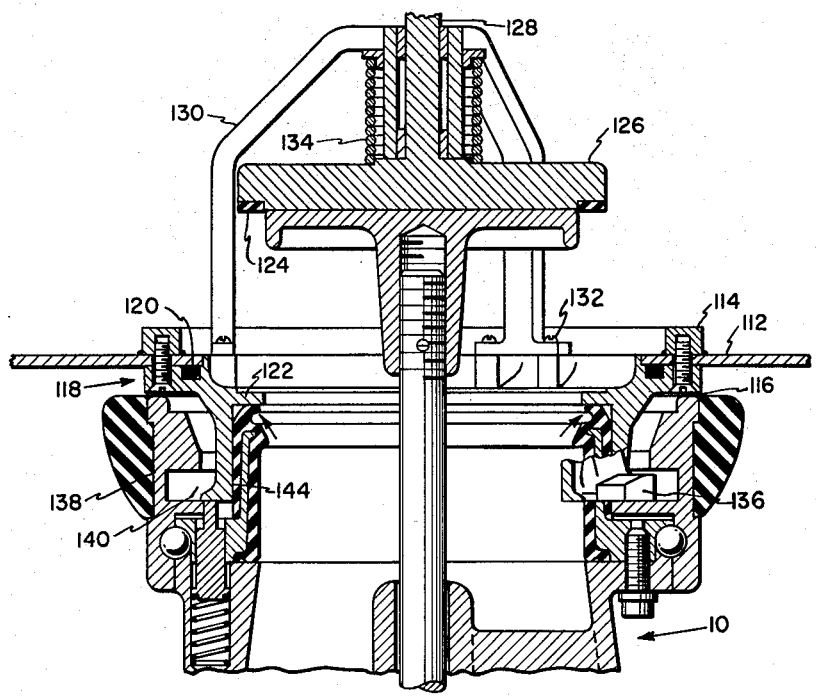
FIG. 5 represents a view generally similar to FIG. 4, but showing the poppet element of the nozzle in raised position with the outlet end of the nozzle open and the valve disc lifted to open the valve.
Figure 6:
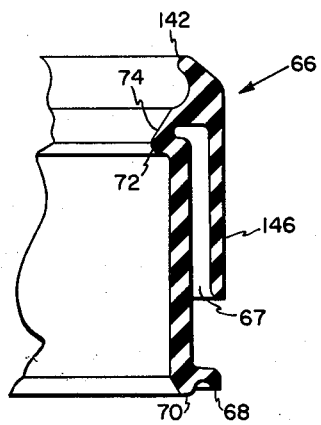
FIG. 6 represents an enlarged fragmentary view in diametral sectional elevation through the aircraft fueling nozzle and valve sealing means of this invention.

Part way down, sleeve 118 is formed with an inwardly extending annular rim 122 which is machined on its upper surface to provide a valve seating surface or valve seat. Resting on this seat is a gasket or sealing ring 124 which is fitted and attached in any suitable way to valve disc 126. A stem 128 extends upwardly from the valve disc to and through a three-legged cage or spider element 130 with which it is in sliding engagement. At their lower ends, the legs of the spider have feet which rest upon pads formed on sleeve 118, each foot being attached to its matching pad by two screws 132 as shown in FIG. 5. Surrounding stem 128 is valve spring 134 which bears against spider 130 at its upper end and against disc 126 at its lower end, and always tends to maintain the valve disc and its sealing ring 124 in seated position.

It is to be noted that sleeve 118, spider 130 attached thereto, valve disc and stem 126 and 128, and valve spring 134 make up a unitary tank valve assembly which can be mounted on or removed from tank panel 112 simply by appropriate manipulation of screws 116.

Along its lower edge, sleeve 118 is formed with a plurality of outwardly extending feet or lugs 136, for example, three lugs. Corresponding in number and spacing to these lugs which may be substantially equally spaced there are vertical slots, not shown, cut all the way through clamping rim 138 which is formed as an integral part of collar structure 76, and extends inwardly from upper ring portion 78 thereof. These vertical slots are sufficiently wide circumferentially and deep radially to allow free passage through them of lugs 136 as fueling nozzle 10 is brought up around sleeve 118. Besides the vertical slots in clamping rim 138 there are dead-ended vertical slots or notches, not shown, cut in sleeve 118 and opening through its bottom surface. These slots correspond in number and spacing to index pins 110, and are sufficiently wide circumferentially and deep vertically to allow free passage into them of the index pins as fueling nozzle 10 is brought up around sleeve 118.

Upward movement of fueling nozzle 10 around sleeve 118 is stopped by the bottom surfaces of lugs 136 coming in contact with the upper surface of annular rim 108 extending inwardly from upper ring portion 78 of collar structure 76. At the end of this movement the lugs are located in circumferential alignment with a groove or channel 140 defined between the upper surface of rim 108 and the lower surface of rim 138.

In the course of upward movement of fueling nozzle around sleeve 118, the top surfaces or ends of locking pins 104 are brought into contact with the bottom surface of the sleeve. Continued upward movement of the nozzle causes these spring-supported pins to be depressed relative to annular rim 108 on collar structure 76. The locking pins will finally be given a sufficient relative depression that the shoulders at the bases of their top sections of small diameter are below the lower surface of annular rim 108. This action unlocks collar structure 76 in rotation with respect to nozzle body 14 since the top sections of pins 104 are not of great enough diameter to hold in the aforementioned cut out or scalloped places in the inner edge of annular rim 108.

While collar structure 76 may now be rotated with respect to nozzle body 14, it is to be understood that the nozzle body itself is effectively locked against any rotation of its own with respect to sleeve 118. Such rotation is prohibited by the engagement of index pins 110 with sleeve 118 as these pins fit in the aforementioned vertical slots or notches in this sleeve.

Rotation of cage-like collar structure 76 with respect to nozzle body 14 is effected by means of handles 92 and 94. Upon the collar structure being turned, lugs 136 are overridden by and relatively pass at least substantially fully under the lower surface of clamping rim 138 as they enter channel or groove 140, this rim and this groove of course each existing only in segments because of the aforementioned vertical slots cut all the way through the clamping rim. At their leading ends, lugs 136 are preferably beveled on their upper surfaces, and likewise the lower surface of clamping rim 138 is preferably cooperatively shaped and provided with a relatively hard insert or bearpiece at the entrance to each segment of channel 140. With these arrangements, and with the vertical dimensions of lugs 136 and channel 140 suitably chosen, there will be an easy entry of the lugs into the channel segments as collar structure 76 is located, with rotation of this structure gradually becoming more difficult, up to a given level of difficulty, as the lugs are are increasingly tightly clamped between rims 108 and 138.

Upon termination of rotation of collar structure 76 by the action of stop boss 102, a very snug bayonet-type joint or connection will have been made between fueling nozzle 14 and sleeve 118, which is in effect to say between the fueling nozzle and the tank valve. Another thing that will have happened is movement of foot portion 100 of collar structure 76 clear of the flat peripheral region of the hub or crank handle 40, thus freeing this handle for rotation downward to elevate poppet 58. It is to be noted in FIG. 4 that the top surface of the poppet element is only very slightly below the bottom surface of valve disc 126.

Still another thing that will have happened, although this will indeed have happened by the end of upward movement of fueling nozzle 10 and prior to the start of rotation of collar structure 76, is the coming in contact of lip 142 at the top of poppet sealing means 66 with the lower surface of inwardly extending annular rim 122 formed on sleeve 118, with at least some downward and inward deflection or deformation of this lip. Thus in FIG. 4 fueling nozzle 10 is not only connected mechanically to the tank valve by a bayonet-type joint as previously described, but also is sealed fluid-tight against the valve by the action of lip 142 of sealing means 66. It is to be noted that this seal has been made prior to any opening or possibility of opening of the outlet end of nozzle 10 which would allow fluid pressure to be exerted against sealing means lip 142.

Referring finally to FIG. 5, crank handle 40 has been lowered and nozzle poppet 58 has been raised accordingly. In the course of rising, the poppet has borne upwardly against valve disc 126 and lifted this disc off of its seat against the force of valve spring 134, with the poppet itself passing well up beyond fuel tank bottom panel 112. The tank valve and the outlet end of the fueling nozzle are now both open, and fuel under pressure can flow from nozzle 10 into the aircraft wing tank.

Almost at the very start of raising of poppet 58, the fluid-tight seal previously existing between the poppet and lip 72 of sealing means 66 was lost, and fluid under pressure was permitted to exert its pressure against the inner surface of sealing means lip 142 as indicated by the arrows. On account of the configuration of this lip, however, especially in its pre-existing condition of at least some downward and inward deflection or deformation, the action of nozzle fluid pressure on lip 142 is simply to push this lip more firmly against the lower surface of annular rim 122 of sleeve 118. Thus increased fluid pressure exerted upon lip 142 of sealing means 66 enhances the sealing effect of this means against sleeve 118, which is to say it improves the seal between the fueling nozzle and the tank valve first created upon the nozzle being connected mechanically to the valve.

It is to be noted generally that on account of the close fit of its inner circumferential surface 144 below rim 122 around outer circumferential surface 146 of sealing means 66, sleeve 118 provides good containment and external radial bracing of the poppet sealing means and the vertical portion of support ring 62 inside of it whenever fueling nozzle 10 is mechanically connected to the tank valve.

When the tank valve is to be closed and the fueling nozzle disconnected and removed from it, crank handle 40 is swung up to lower poppet element 58 with valve disc 126 following downwardly onto its seat under the urging of spring 134. A seal will be made between the poppet and lip 72 of sealing means 66 to provide fluid-tight closure of the outlet end of nozzle 10 while the seal between the fueling nozzle and the tank valve made by lip 142 of sealing means 66 still exists.

Collar structure 76 may next be rotated back by means of handles 92 and 94 to bring foot portion 100 over the flat peripheral region of the hub of crank handle 40 to lock this handle up and poppet 58 down, and at the same time to break the bayonet-type connection between the fueling nozzle and the tank valve thus permitting the nozzle to be lowered away from the valve. As the fueling nozzle is lowered, locking pins 104 urged by springs 106 are permitted to rise relative to nozzle body 14 with their middle portions of larger diameter entering the cut out places in inwardly extending annular rim 108 of collar structure 76 whereby the collar structure is locked against further rotataion with respect to the nozzle body portion.

Protection by Letters Patent of this invention as the same is defined in the appended claims is sought to greatest extent that the prior art allows.

What is claimed is:

1. In a fueling nozzle characterized by a body portion having an outlet end and an outlet passage and a poppet element adapted to be extended beyond said outlet end to open said nozzle and retracted into said outlet passage to close said nozzle, the improvement which comprises a poppet sealing means of flexible, resilient material and ring-like configuration fitted at said outlet end, said sealing means having a lip extending inwardly from said body portion toward the center of said passage in position to engage the lower periphery of said poppet element when it is in retracted position, said lip having an upper surface adapted to provide a seat for said poppet when said poppet is in retracted position and a lower surface extending inwardly from said body portion into said passage adapted for exposure to fluid pressure within said nozzle to cause said lip to be pressed within said nozzle to cause said lip to be pressed firmly against said poppet in retracted position whereby the sealing effect of said sealing means against said poppet to provide fluid-tight closure of the outlet end of said nozzle is enhanced, said inwardly extending lip being near the upper end of said poppet sealing means and said sealing means having additionally an outwardly extending lip at its lower end, and said nozzle being characterized further by an internal circumferential groove near its outlet end within which groove said outwardly extending lip on said sealing means is fitted.

2. The improvement according to claim 1, said inwardly extending lip being near the upper end of said poppet sealing means and said sealing means being characterized by a generally annularly shaped cut out internal region closed at its upper end and open outwardly near its lower end, and said nozzle having additionally an upwardly extending ring-like portion occupying substantially the entirety of said cut out region to support said sealing means.

3. The improvement according to claim 2, said ring-like portion of said nozzle being in at least semi-hooked engagement at its upper end with said sealing means.

4. The improvement according to claim 1, said upper surface of said inwardly extending lip being a sloping surface.

5. The improvement according to claim 1, said upper surface of said inwardly extending lip sloping downwardly and inwardly.

6. In a fueling nozzle characterized by an outlet end and having a poppet element adapted to be extended beyond said outlet end to open said nozzle and retracted into said outlet end to close said nozzle, said nozzle being adapted to be connected mechanically to a normally closed disc-type valve in a manner allowing said poppet to bear upon and displace the disc element of said valve to open said valve upon said poppet being extended beyond the outlet end of said nozzle, the improvement which comprises a nozzle-to-valve sealing means of flexible, resilient material and ring-like configuration fitted at said outlet end, said sealing means having a generally upwardly and inwardly extending lip at its upper end which is adapted to bear against and be deflected somewhat downwardly and inwardly by said valve upon said nozzle being connected mechanically thereto to provide a seal between said nozzle and said valve, and which has an inner surface adapted for exposure to fluid pressure upon the opening of the outlet end of said nozzle and accompanying open of said valve to cause said upwardly extending lip to be pressed firmly against said valve whereby the sealing effect of said sealing means against said valve to render the connection between said nozzle and said valve fluid-tight is enhanced.

7. In a fueling nozzle characterized by an outlet and having a poppet element adapted to be extended beyond said outlet end to open said nozzle and retracted into said outlet end to close said nozzle, said nozzle being adapted to be connected mechanically to a normally closed disc-type valve in a manner allowing said poppet to bear upon and displace the disc element of said valve to open said valve upon said poppet being extended beyond the outlet end of said nozzle, the improvement which comprises a poppet sealing means of flexible, resilient material and ring-like configuration fitted at said outlet end, said sealing means having (1) an inwardly extending lip with an upper surface adapted to provide a seat for said poppet when said poppet is in retracted position and a lower surface adapted for exposure to fluid pressure to cause said lip to be pressed firmly against said poppet in retracted position whereby the sealing effect of said sealing means against said poppet to provide fluid-tight closure of the outlet end of said nozzle is enhanced, and (2) a generally upwardly and inwardly extending lip at its upper end having an inner diameter of less than the diameter of said poppet element, which is adapted to bear against and be deflected somewhat downwardly and inwardly by said valve upon said nozzle being connected mechanically thereto to provide a seal between said nozzle and said valve, and which has an inner surface adapted for exposure to fluid pressure upon the opening of the outlet end of said nozzle and accompanying opening of said valve to cause said upwardly extending lip to be pressed firmly against said valve whereby the sealing effect of said sealing means against said valve to render the connection between said nozzle and said valve fluid-tight is enhanced.

8. As an article of manufacture an outlet end closure sealing means for a poppet-type nozzle, said sealing means being of flexible, resilient material and ring-like configuration and having (1) an upwardly and inwardly extending lip near its upper end, (2) an outwardly extending lip at its lower end having a downwardly turned outer end portion and a radially inner heel portion extending below the level of said outer end portion, said outer end portion and said heel portion defining an intermediate downwardly facing peripheral cavity therebetween and (3) an upwardly and somewhat inwardly extending lip at its upper end having a radially innermost diameter less than that of said first mentioned lip, and said sealing means being characterized by a generally annularly shaped cut out internal region closed at its upper end and open outwardly near its lower end.

9. An outlet end closure sealing means for a poppet-type nozzle according to claim 8 in which said inwardly extending lip has an upper surface sloping downwardly and inwardly.

10. An outlet end closure sealing means for a poppet-type nozzle according to claim 8 in which said cut out internal region extends at least somewhat inwardly at its upper, closed end.

References Cited by the Examiner
UNITED STATES PATENTS

| | | | |
|---|---|---|---|
| 1,833,228 | 11/31 | Reynolds | 141—387 |
| 2,302,443 | 11/42 | Hodsdon | 119—14.49 X |
| 2,341,950 | 2/44 | Schepps | 141—387 |
| 2,366,520 | 1/45 | Griffith. | |
| 2,509,656 | 5/50 | Tomoser | 251—172 |
| 2,737,401 | 3/56 | Lindsay. | |
| 2,857,129 | 10/58 | Overholser | 251—172 |
| 2,925,992 | 2/60 | Rickard | 251—172 |
| 3,045,721 | 7/62 | Shepherd | 141—349 |
| 3,086,565 | 4/63 | Mosher | 141—349 XR |
| 3,096,071 | 7/63 | Fisher | 251—175 XR |

ISADOR WEIL, *Primary Examiner.*

CLARENCE R. GORDON, *Examiner.*